US006104585A

United States Patent [19]

Matsui et al.

[11] Patent Number: 6,104,585

[45] Date of Patent: Aug. 15, 2000

[54] PROTECTION CIRCUIT FOR TAP-GROUNDED LEAKAGE TRANSFORMER

[75] Inventors: Yoshihiro Matsui; Takayuki Ando; Kazuyuki Hayakawa, all of Gifu, Japan

[73] Assignee: Kabushiki Kaisha Sanyo Denki Seisakusho, Gifu, Japan

[21] Appl. No.: 09/225,838

[22] Filed: Jan. 6, 1999

[30] Foreign Application Priority Data

Jan. 12, 1998 [JP] Japan .................................. 10-003919
May 20, 1998 [JP] Japan .................................. 10-138637

[51] Int. Cl.[7] ........................................ H02H 3/33

[52] U.S. Cl. ................................ 361/38; 361/35; 361/42; 361/45; 361/90; 315/307

[58] Field of Search ................................ 361/35, 38, 42, 361/45, 36, 78, 43, 86; 363/90, 88, 50, 74, 75; 323/355; 315/254, 302, 291, 297, 307

[56] References Cited

U.S. PATENT DOCUMENTS 4,563,719 1/1986 Nilssen ...................................... 361/45
5,822,201 10/1998 Kijima ...................................... 363/25
5,892,646 4/1999 Parker et al. ............................. 361/42
5,914,843 6/1999 Hopkins et al. .......................... 361/42

*Primary Examiner*—Jeffrey Gaffin
*Assistant Examiner*—Kim Huynh
*Attorney, Agent, or Firm*—Pollock Vande Sande & Amernick

[57] ABSTRACT

Induced voltages of two tertiary coils magnetically coupled with two secondary coils, respectively, are detected separately by two voltage detector circuits, and the detected voltages V1 and V2 are compared by two comparators with a reference voltage VS. When wiring connected to either one of the two secondary coils or a neon tube is grounded, the induced voltage of the corresponding tertiary coil decreases, then the output from the corresponding comparator is reduced down to zero volt, then a light emitting element emits light, and a phototriac is turned ON to actuate a relay to turn OFF its contact switch, shutting off the supply of AC power.

11 Claims, 6 Drawing Sheets

PROTECTION CIRCUIT FOR TAP-GROUNDED LEAKAGE TRANSFORMER

BACKGROUND OF THE INVENTION

The present invention relates to a protection circuit for a tap-grounded leakage transformer which boosts input AC power to light gas-filled lamps such as neon or argon tubes and, more particularly, to a protection circuit for a leakage transformer having its secondary coil grounded at the midtap thereof which shuts off the input AC power upon detection of an abnormality such as the grounding of a load or wiring, disconnection of load wiring, or cracking of the lamp envelope.

FIG. 1 depicts a conventional leakage transformer 11 of this kind and a ground fault protection circuit 10. A primary coil 12 of the leakage transformer 11 has its both ends connected via a switch 13 to input terminals 14 and 15, and two secondary coils 16 and 17 have their inner ends C interconnected each other and also connected to an earth terminal 18 of a transformer case 36, that is, to the case 36. The earth terminal is grounded, and outer ends of the second coils 16 and 17 are connected to output terminals 21 and 22, between which there are connected gas-filled lamps 23 such as neon or argon tubes. AC power, for example, commercial power is applied across the input terminals 14 and 15 and is boosted by the transformer 11 to light the lamps 23.

The protection circuit 10 which cuts off the input AC power upon detecting a ground fault which is caused, for example, by accidental contact of the gas-filled lamp 23 or its wiring with the case 36. Provided adjacent the secondary coils 16 and 17 are tertiary coils 25 and 26 which are magnetically coupled therewith and form part of the protection circuit 10. Normally the secondary coils 16 and 17 are wound around the tertiary coils 25 and 26, respectively, which are coiled directly around magnetic cores; high withstand-voltage insulation layers which have a withstand voltage substantially in the range of from 6000 to 7000V are interposed between the secondary coils 16, 17 and the tertiary coils 25, 26, respectively, to provide therebetween sufficient electrical insulation and tight magnetic coupling.

The tertiary coils 25 and 26 are interconnected at one end in opposite phase so that their induced voltages cancel each other. The other ends of the tertiary coils 25 and 26 are connected to the input side of a rectifying smoothing circuit 27. The output side of the circuit 27 is connected via a Zener diode 28 to both ends of a parallel circuit of a resistor 31 and a capacitor 32, and the both ends are connected to the gate and cathode of a triac 33. The triac 33 is connected between the input terminals 14 and 15 via a relay 34, and a relay contact of the relay 34 forms the switch 13.

Under normal operating conditions, the voltages that are induced in the tertiary coils 25 and 26 are nearly equal but opposite in phase, and consequently, the input voltage to the rectifying smoothing circuit 27 is substantially zero. However, a ground fault of the lamp 23 or its wiring develops a short circuit across that one of the secondary coil which is grounded, and the induced voltage of the tertiary coil coupled with the grounded secondary coil significantly decreases, leading to the application of the entire induced voltage of the other tertiary coil to the rectifying smoothing circuit 27. This voltage is rectified and smoothed, and the output voltage rises, turning ON the Zener diode 28. As the result of this, the triac 33 turns ON to actuate the relay 34 and hence open the switch 13, shutting off the supply of the input AC power to the transformer 11. The relay contact of the switch 13 is connected to a normally open side NO, through which an operating current passes to the relay 34.

As is schematically shown in FIG. 2 wherein the parts corresponding to those in FIG. 1 are identified by the same reference numerals, there may be cases where the case 36 of the leakage transformer 11 is not grounded and hence the connection point C of the secondary coils 16 and 17 is not grounded either (but connected to the case 36) and the intermediate point between adjacent gas-filled lamp 23 is grounded. In such a situation, since the connection point C of the secondary coils 16 and 17 is isolated from ground although the wiring of the afore-mentioned one of them or the lamp 23 is grounded, the induced voltages of the secondary coils 16 and 17 and consequently the induced voltages of the tertiary coils 25 and 26 are not determined; therefore, no change is detected in the difference between the induced voltages of the tertiary coils 25 and 26. In other words, no ground fault protection is provided.

This will be further described below. When the lamps 23 are all being lit under normal conditions, the potential at the connection point C of the secondary coils 16 and 17 with respect to a ground E is determined by impedance values of loads including the lamps on both sides of the ground E, and varies with the state of equilibrium between the impedances of the both loads, and hence it does not become constant. Accordingly, the voltages that are induced in the tertiary coils 25 and 26 in accordance with the voltages of the secondary coils 16 and 17 do not become stabilized, and do not always become equal to each other.

Now, assume that a ground fault occurs at the point A on the side of the secondary coil 16 in FIG. 2. The potential at the connection point C of the secondary coils 16 and 17 with respect to the ground E depends on a load potential at the point B and the potential of the secondary coil 16 on the point A side; this potential does not become constant, either, but it becomes lower than the potential under the normal operating conditions. The same is true of the case where a ground fault occurs only at the point B. When the point A or B is grounded, however, substantially no difference arises between the voltages that are induced in the tertiary coils 25 and 26 in accordance with the induced voltages of the secondary coils 16 and 17. On this account, the voltage difference cannot be distinguished from the voltage difference between the tertiary coils 25 and 26 based on an imbalance between the load impedances.

Moreover, no circuit has been used to detect and protect against no-load conditions such as disconnection of the wiring of the lamp 23 or cracking of its lamp envelope. In addition, high dielectric-strength insulating layers, which withstand high voltages substantially in the range of from 6000 to 7000V at all times, have been interposed between the secondary coils 16, 17 and the tertiary coils 25, 26, respectively—this has inevitably raised the manufacturing costs.

SUMMARY OF THE INVENTION

It is therefore an object of the present invention to provide a protection circuit which detects a ground fault of series-connected gas-filled lamps having their intermediate grounded and their wiring and/or no-load conditions and shuts off power accordingly.

According to the present invention, induced voltages of two tertiary coils, which are magnetically coupled with two secondary coils, respectively, are detected individually by two voltage detector circuits, and the detected voltages are compared by different comparators with a reference voltage. If even one of the voltages falls short of the reference voltage, the supply of the input AC power is cut off to protect against a ground fault. Alternatively, if even one of the detected voltages exceeds the reference voltage, the supply of the input AC power is also shut off to protect against a no-load fault.

A combination of these two configurations provides a protection circuit which functions upon occurrence of the no-load condition as well as the ground fault.

The two tertiary coils are disposed concentrically with the two corresponding secondary coils on the inside thereof, and the tertiary and secondary coils are separated by sheets of insulating paper which are wound around the tertiary coils two or more turns and have a dielectric strength of several hundred volts.

DETAILED DESCRIPTION OF THE PREFERRED EMBODIMENT

Figure 1:
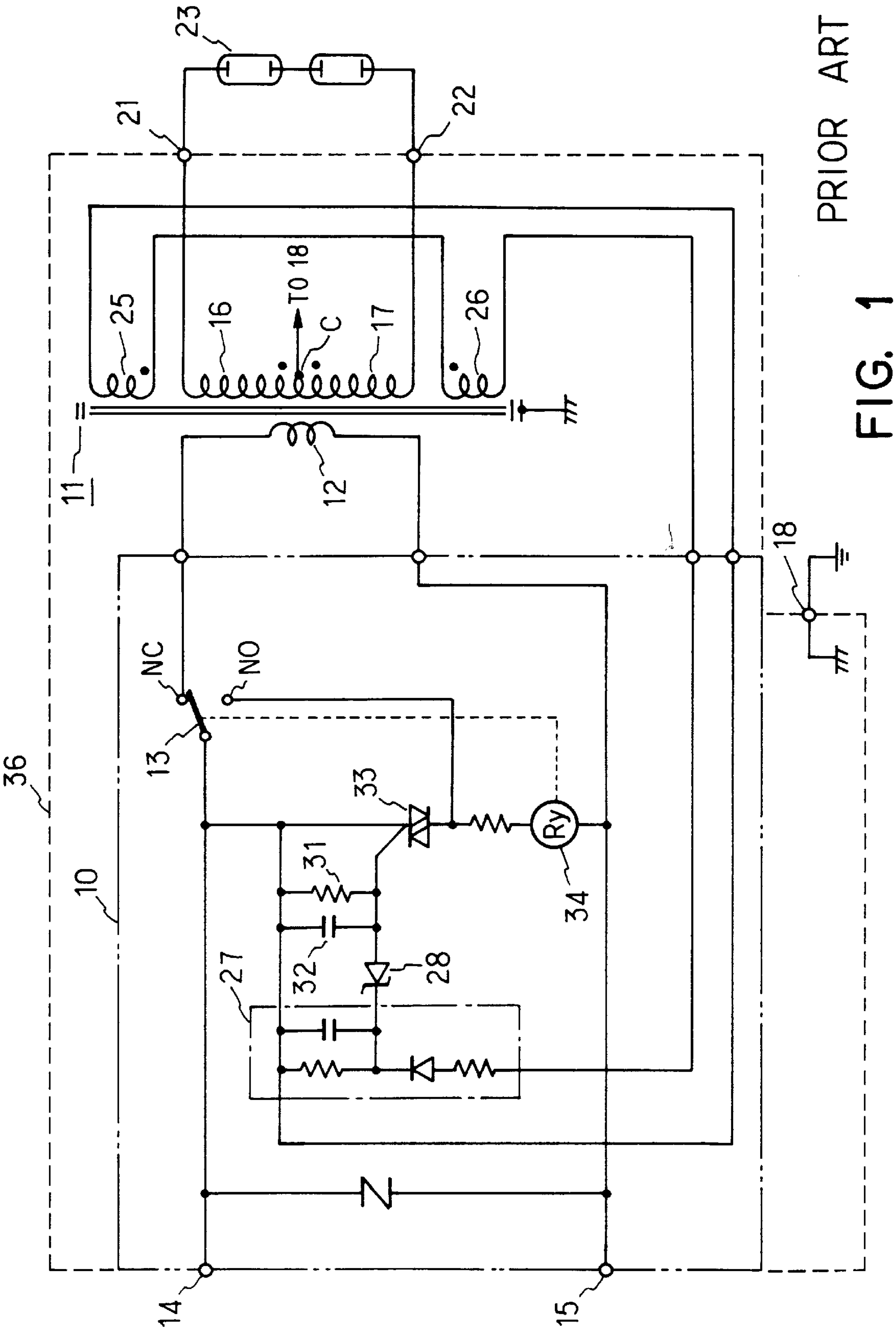
PRIOR ART FIG. 1
FIG. 1 is a circuit diagram depicting a conventional tap-grounded leakage transformer equipped with a ground fault protecting function.
Figure 2:
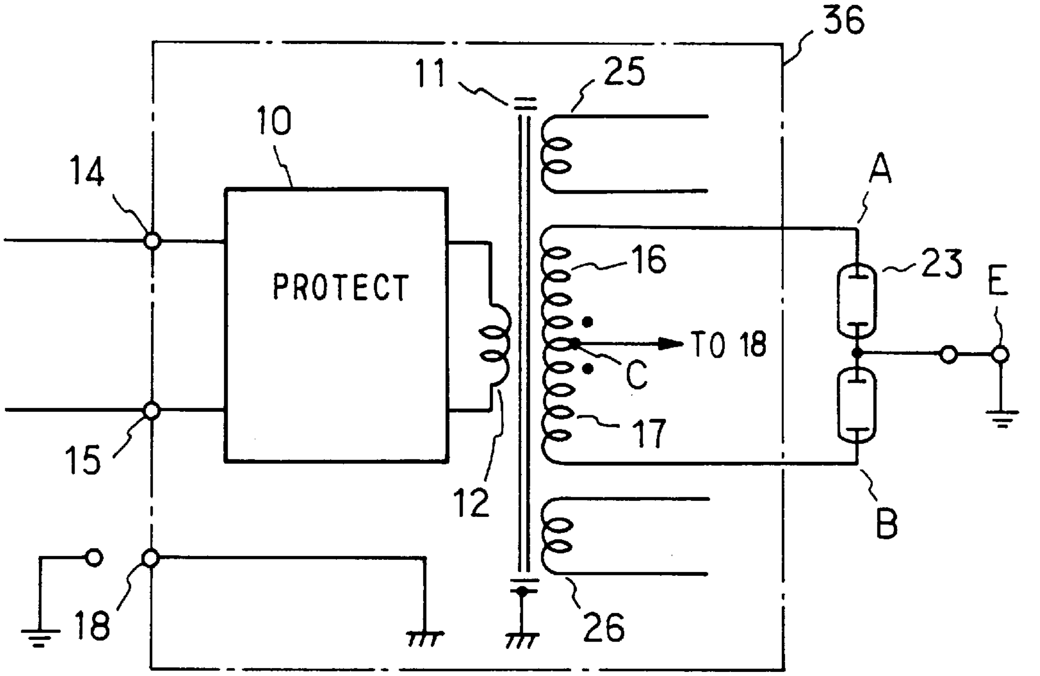
FIG. 2 PRIOR ART
FIG. 2 is a circuit diagram showing the state of connection in which the conventional circuit cannot accurately detect a ground fault.
Figure 3:
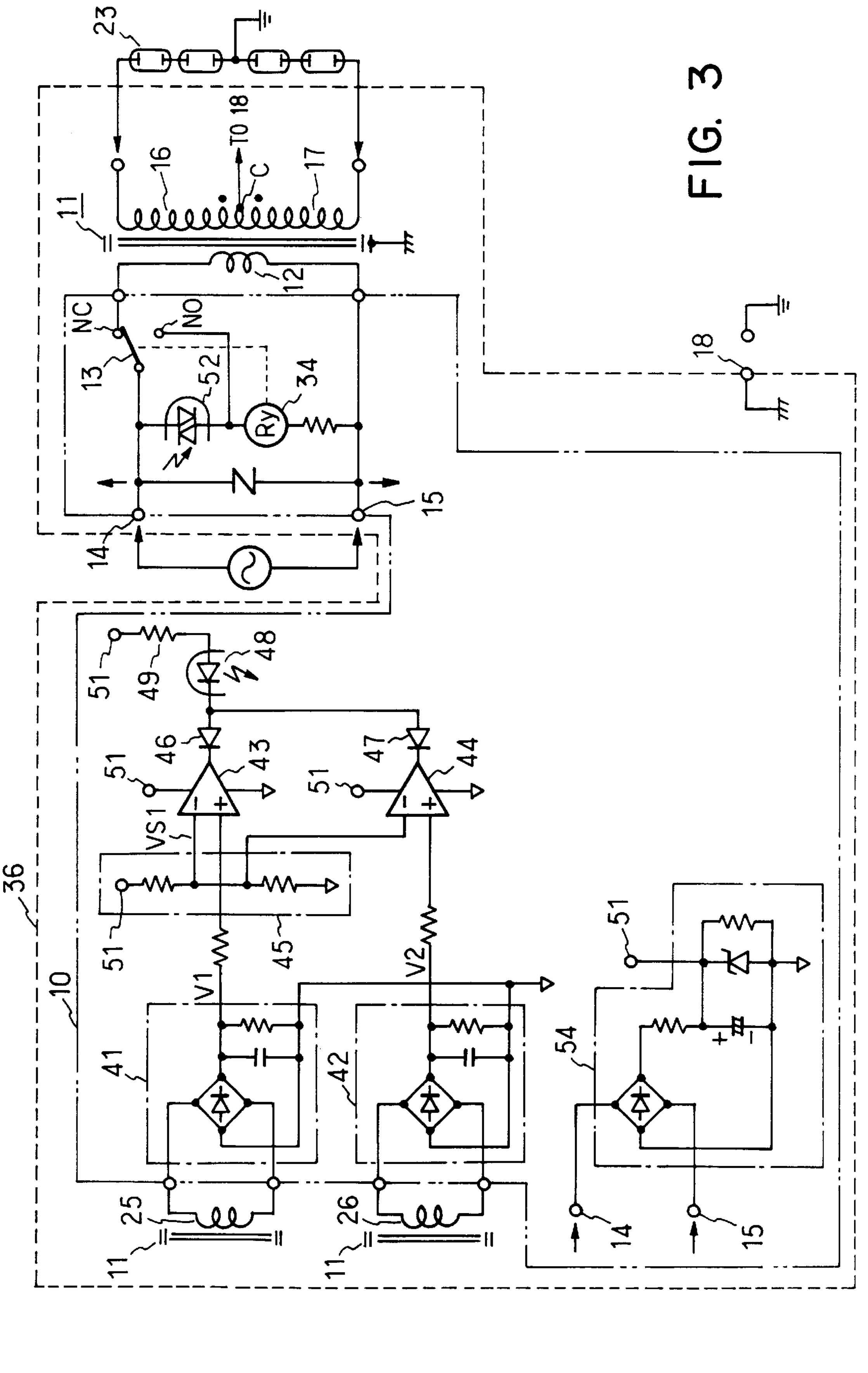
FIG. 3 is a circuit diagram illustrating an embodiment of the present invention applied to the detection of a ground fault.

In FIG. 3 there is shown an embodiment of the present invention applied to a ground fault protection circuit, the parts corresponding to those in FIG. 1 being identified by the same reference numerals. The tertiary coils 25 and 26 are shown to be separated from the secondary coils 16 and 17, but in practice they are magnetically coupled with each other.

The voltages that are induced in the tertiary coils 25 and 26 are detected by voltage detector circuits 41 and 42 after being rectified and smoothed. The detected voltages of the voltage detector circuits 41 and 42 are fed to non-inverting input terminals of comparators 43 and 44, respectively, wherein they are compared with a reference voltage VS1 which is applied to inverting terminals of the comparators from a ground fault reference voltage generator circuit 45 composed of two voltage dividing resistors. The comparators 43 and 44 have their output terminals connected via reverse-current protection diodes 46 and 47 to one end of a light emitting element 48 of a photocoupler. The other end of the light emitting element 48 is connected via current-limiting resistance element 49 to a power supply terminal 51. Accordingly, when at least one of the diodes 46 and 47 is forward-biased, a current flows in the light emitting element 48, causing it to emit light.

A phototriac 52, which serves as a light receiving element of the photocoupler, is connected across the AC power input terminals 14 and 15 via the relay 34. A power supply circuit 54 is connected across the input terminals 14 and 15. The input AC power is rectified and smoothed by the power supply circuit 53, from which it is output, for example, as a constant voltage of 15 V. This constant voltage is applied to power supply terminals of the comparators 43 and 44 and a power supply terminal 51 of the reference voltage generator circuit 45.

Under normal operating conditions in which the lamps 23 or their wiring are not grounded, normal voltages are generated from the secondary coils 16 and 17, and consequently, relatively large voltages corresponding to those in the secondary coils are also induced in the tertiary coils 25 and 26. The detected voltages V1 and V2 by the voltage detector circuits 41 and 32 are both higher than the reference voltage VS1, and the outputs from the comparators 43 and 44 become about the same as that at the power supply terminal 51. As a result, the diodes 46 and 47 become reverse-biased.

However, when any one of the lamps 23 or its wiring is grounded, for example, when the high-tension side of the secondary coil 16 is grounded, the voltage that is induced in the tertiary coil 25 becomes zero or remarkably low, and the detected voltage V1 by the voltage detector circuit 41 becomes lower than the reference voltage VS1. In consequence, the output from the comparator 48 becomes substantially zero volt, and the diode 46 becomes forward-biased, feeding current to the light emitting element 48 to cause it to emit light. Hence, the phototriac 52 turns ON, and the relay 34 operates to open its contact switch 13, stopping the supply of AC power to the transformer 11.

Also when the high-tension side of the secondary coil 17 is grounded, the induced voltage of the tertiary coil 26 similarly decreases, then the output from the comparator 44 becomes zero volt, and the light emitting element 48 emits light, shutting off the supply of input AC power. In this way, protection is provided against a ground fault.

Figure 4:
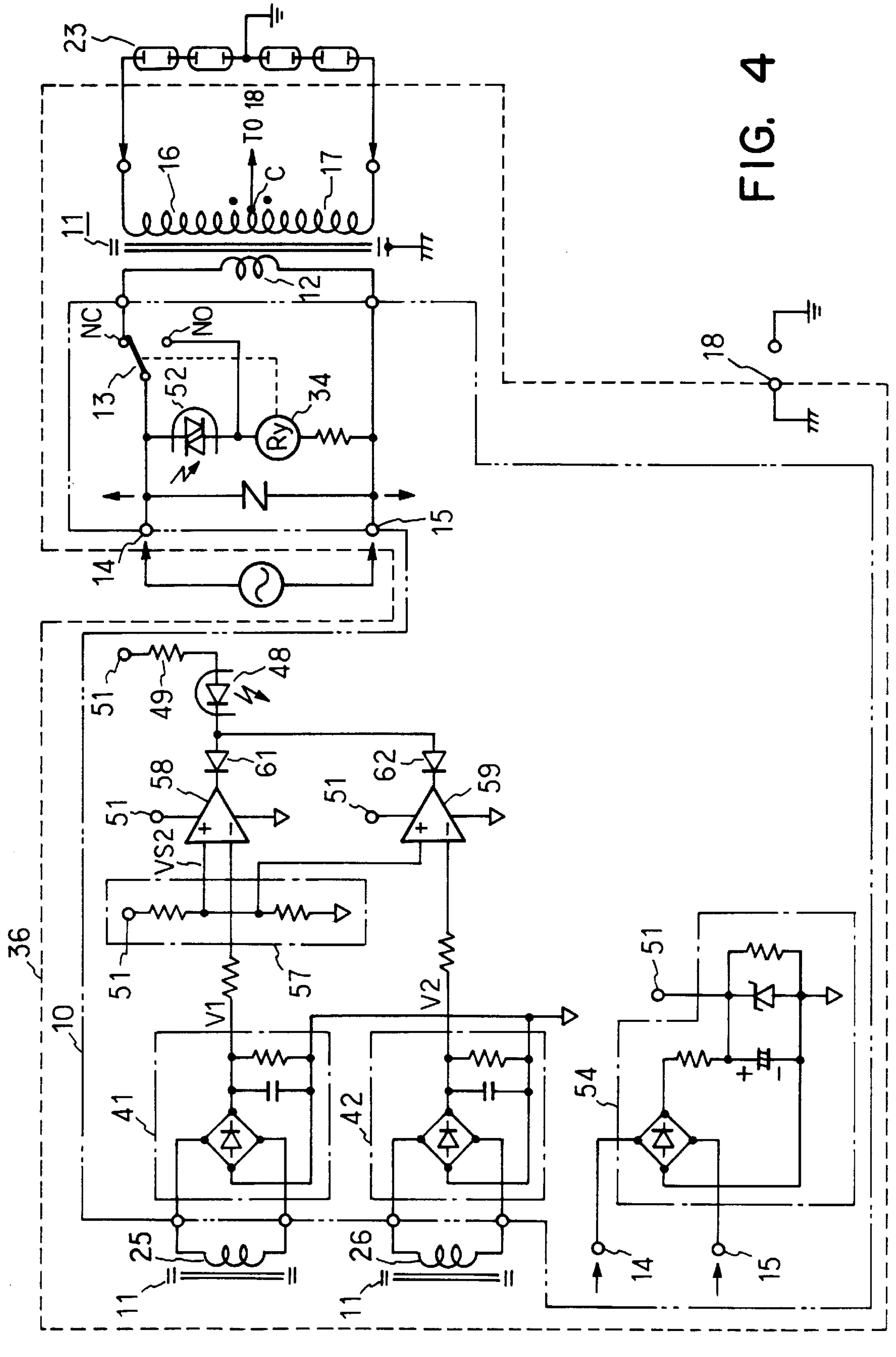
FIG. 4 is a circuit diagram illustrating another embodiment of the present invention applied to the detection of a no-load fault.

In FIG. 4 there is depicted another embodiment of the present invention applied to a no-load protection circuit, the parts corresponding to those in FIG. 3 being identified by the same reference numerals. The circuit configuration of this embodiment is substantially identical with the FIG. 3 circuit except that the ground fault reference voltage generator circuit 45 in the latter is replaced with a no-load reference voltage generator circuit 57, whose reference voltage VS2 is applied to non-inverting input terminals of comparators 58 and 59, and that the outputs from the voltage detector circuits 41 and 42 are applied to inverting input terminals of the comparators 58 and 59, respectively. The no-load reference voltage generator circuit 57 is given a voltage dividing ratio different from that of the ground fault reference voltage generator circuit 45 so that the reference voltage VS2 may be higher than that VS1.

With the arrangement of FIG. 4, under the normal operating conditions where the lamps 23 are not disconnected or their envelopes are free from cracking, normal voltages are generated by the secondary coils 16 and 17, and consequently, relatively high voltages are also induced in the tertiary coils 25 and 26 correspondingly. Since the reference voltage VS2 is chosen to be higher than the voltages V1 and V2 that are detected by the voltage detector circuits 41 and 42 during the normal operation, however, the output voltages from the comparators 58 and 59 become nearly equal to the voltage at the power supply terminal 51, and reverse-current protection diodes 61 and 62 get reverse-biased.

For example, when the load connected to the secondary coil 16 disappears as the result of disconnection of any one of the lamps 23 or cracking of its lamp envelope, the voltage that is induced in the tertiary coil 25 remarkably increases as compared with that during the normal operation, and the detected voltage V1 by the voltage detector circuit 41 exceeds the reference voltage VS2 and the output from the comparator 58 is reduced down to substantially zero volts. As a result, the diode 61 becomes forward-biased, then current flows in the light emitting element 48 to cause it to emit light, and the phototriac 52 is turned ON, actuating the relay 34 to open its contact switch 13 and hence stop the supply of AC power to the transformer 11. In this way, protection is provided against the no-load fault.

Figure 5:
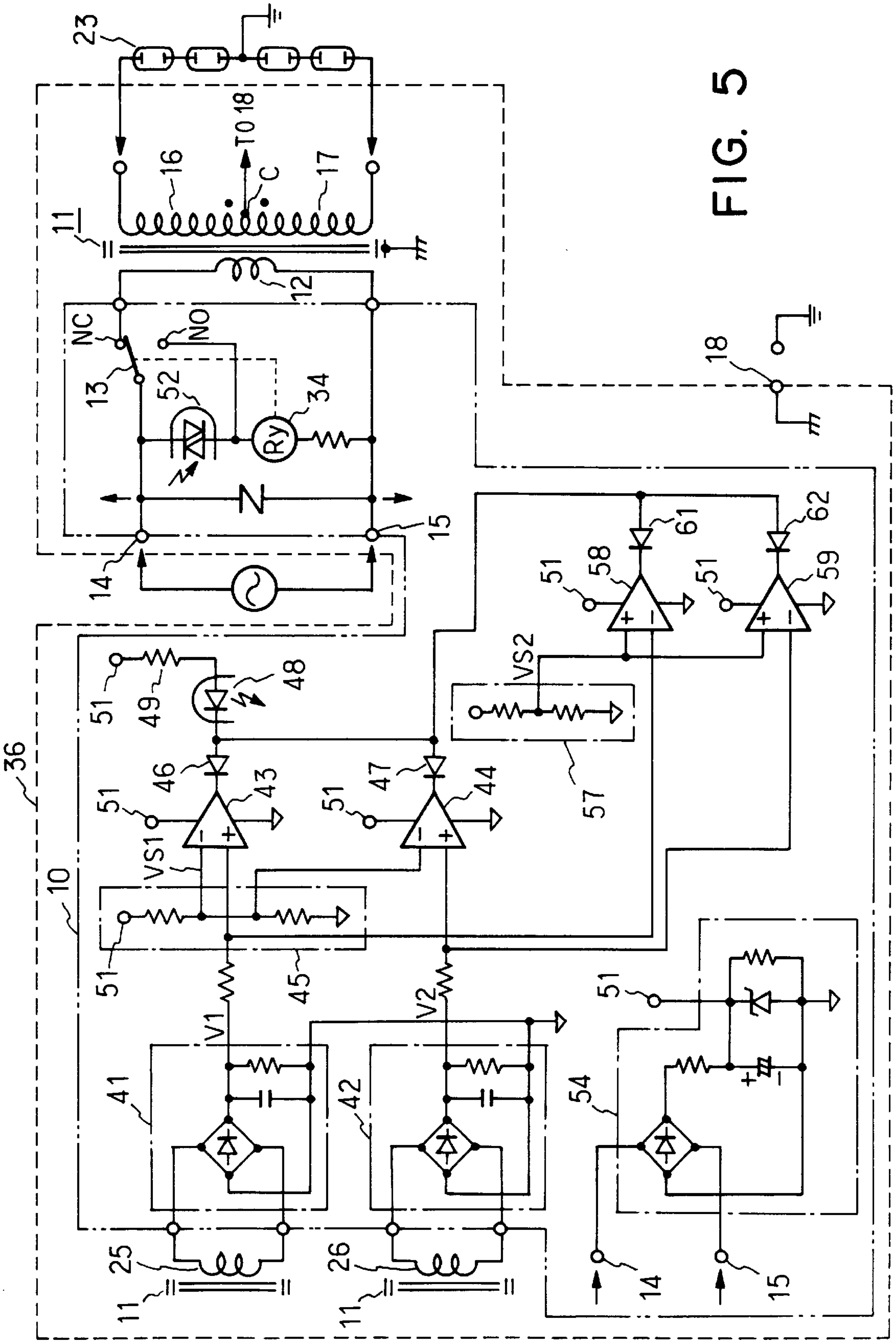
FIG. 5 is a circuit diagram illustrating another embodiment of the present invention adapted to be capable of detecting either of the ground fault and the no-load fault.

Turning next to FIG. 5, another embodiment of the present invention will be described which is applied to a protection circuit equipped with both of the functions of ground fault protection and no-load fault protection. The parts corresponding to those in FIGS. 3 and 4 are identified by the same reference numerals. The circuit configuration of this embodiment is about the same as the FIG. 3 circuit configuration except that the no-load reference voltage generator circuit 57, the comparators 58 and 59 and the reverse-current protection diodes 61 and 62 are additionally provided and connected in the same manner as depicted in FIG. 4. The operation of this circuit is the same as described above with respect to FIGS. 3 and 4, and hence it will not be described. With such an arrangement as shown in FIG. 5, it is possible not only to provide both of the ground fault protection and the no-load fault protection but also to reduce the number of parts used as compared with that for separately providing a ground fault protection circuit and a no-load fault protection circuit, because the parts except the reference voltage generator circuit, the comparators and the reverse-current protection diodes can be used in common to the ground fault protection and the no-load fault protection.

Figure 6:
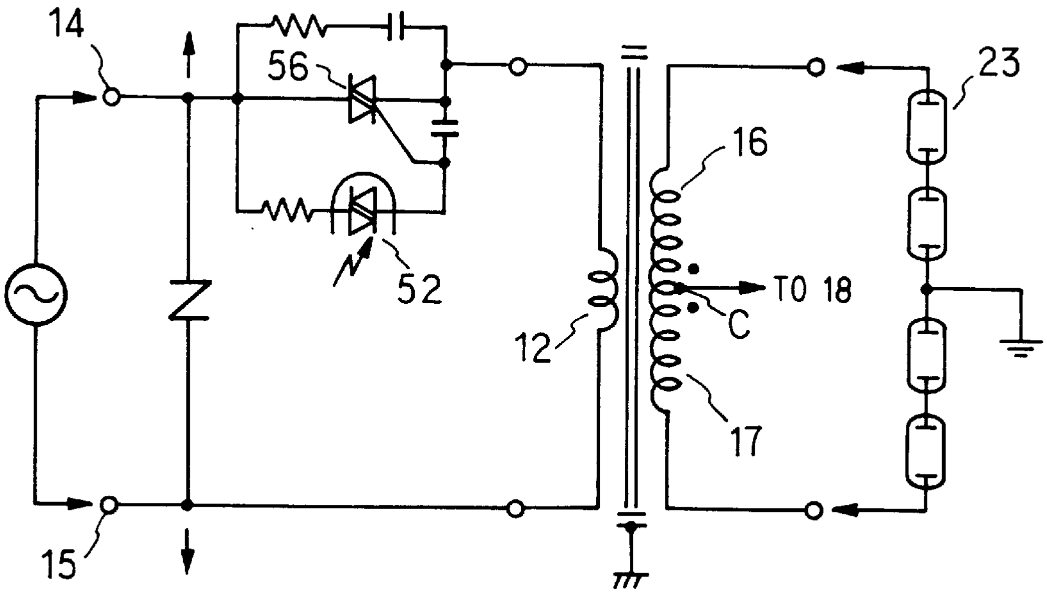
FIG. 6 is a circuit diagram showing part of another embodiment of the present invention.

As depicted in FIG. 6, the switch 13 may be such an electronic switch as a triac 56. In this instance, the light receiving triac 52 is connected between the gate and cathode of the triac 56; under normal operating conditions the phototriac 52 is in the OFF state and the triac 56 used as the switch 13 is in the ON state. In the event of a trouble, when the light emitting element 48 in FIG. 3, 4, or 5 emits light to turn ON the phototriac 52, and the triac 56 turns OFF.

Figure 7A:
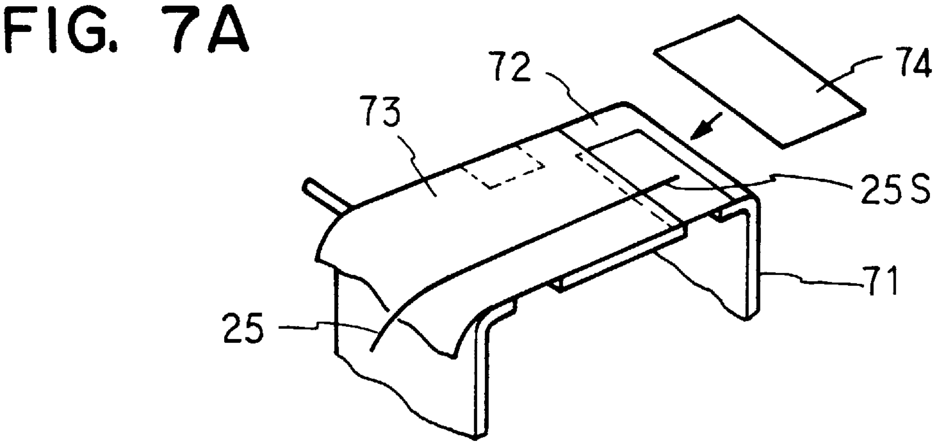
FIG. 7A is a perspective view depicting an example of a first tertiary coil winding step.
Figure 7B:
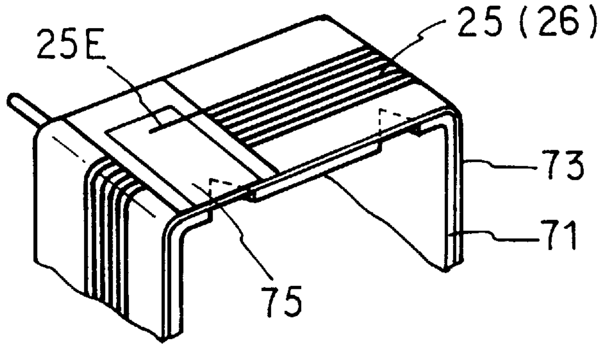
FIG. 7B is a perspective view depicting an example of a second tertiary coil winding step.
Figure 7C:
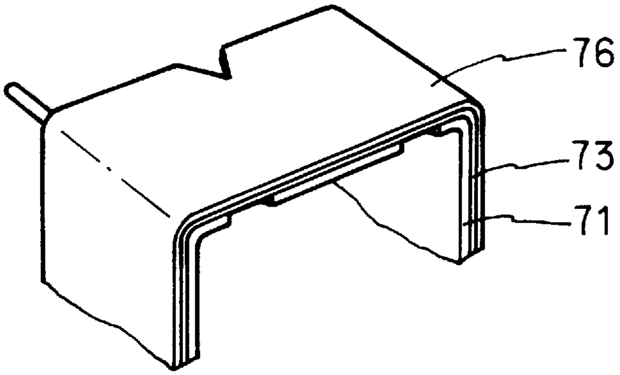
FIG. 7C is a perspective view depicting an example of a third tertiary coil winding step.
Figure 7D:
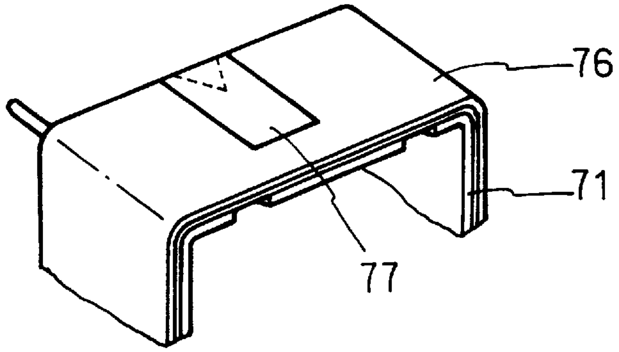
FIG. 7D is a perspective view depicting an example of a fourth tertiary coil winding step.

Next, a description will be given, with reference to FIGS. 7A to 7D, of the construction of the leakage transformer 11 for use in the embodiments of the present invention. As depicted in FIG. 7A, an outgoing-line electrode 72 formed as of copper foil is disposed on a secondary coil bobbin 71, and if necessary, an insulating layer 73 of a relatively low dielectric strength, such as a sheet of insulating paper for paper capacitor use, is wound on the bobbin 71 with part of the electrode 72 left uncovered. The inner end portion 25S of a tertiary coil 25 (26) formed, for example, by a tin-plated copper wire, is soldered onto the outgoing-line electrode 72, and the soldered portion is covered with a sheet of protection paper 74 such as kraft paper, after which the tertiary coil 25 is wound around the bobbin 71 as shown in FIG. 7B. An outgoing-line electrode 75 formed of copper foil is disposed on the tertiary coil 25, onto which the outer end portion 25E of the tertiary coil 25 is soldered. A sheet of insulating paper 76 of relatively low dielectric strength, such as insulating paper for paper capacitor use or kraft paper whose one-minute dielectric strength is several hundred volts, is wound on the tertiary coil 25 about several to ten turns as depicted in FIG. 7C. Then an electrode 77 for leading out the inner end of the secondary coil 16 (17) is disposed on the insulating paper 76 as shown in FIG. 7D, and the secondary coil 16 (17) is similarly wound around the bobbin 71 though not shown. That is, the tertiary coil 25 is wound on the bobbin 71 concentrically with the secondary coil 16 on the inside thereof with the insulating paper 76 interposed therebetween.

EFFECTS OF THE INVENTION

As described above, according to the present invention, even under operating conditions wherein the case 36 of the leakage transformer is not grounded and the intermediate point between adjacent gas-filled lamps is grounded (as shown in FIG. 1), induced voltages of the tertiary coils 25 and 26 are separately detected by the voltage detectors 41 and 42 and their output voltages V1 and V2 are compared with a reference voltage. If a ground fault occurs, the potential at the connection point of the secondary coils 16 and 17 drops relative to a ground. Consequently, the induced voltages of the tertiary coils 25 and 26 decrease, and at least one of the comparators 43 and 44 inverts, thus ensuring the detection of the ground fault.

In the event of a no-load fault, too, the potential at the connection point of the secondary coils 16 and 17 rises relative to the ground. In consequence, the induced voltages of the tertiary coils 25 and 26 markedly increase, and at least one of the comparators 58 and 59 inverts, ensuring the detection of the no-load fault.

It is also possible to detect the ground fault and the no-load fault under normal operating conditions in which the case 36 of the transformer is grounded as depicted in FIG. 1.

As will be appreciated from the above, the present invention ensures the detection of the ground fault or no-load fault even under operating conditions wherein the transformer case is not grounded, the tap of one of the secondary coils is connected to the case and the intermediate point between adjacent lamps is grounded. Since the input power to the primary coil is shut off upon detection of the fault, it is for a short period of time that a high voltage is applied across the secondary and tertiary coils. Hence, a low-dielectric-strength insulator whose one-minute dielectric strength is around 600 V can be used as the insulating paper 76 that is interposed between the secondary and tertiary coils—this permits reduction of manufacturing costs.

It will be apparent that many modifications and variations may be effected without departing from the scope of the novel concepts of the present invention.

What is claimed is:

1. A protection circuit for a tap-grounded leakage transformer which is supplied at its primary coil with AC power across power supply terminals and lights a plurality of series-connected gas-filled lamps connected between outer ends of two secondary coils having their inner ends connected to grounding terminals, respectively, the intermediate point between said gas-filled lamps being grounded, said protection circuit comprising:

first and second tertiary coils placed near said two secondary coils, respectively, and magnetically coupled therewith;

first and second voltage detector circuits for detecting voltages induced in said two tertiary coils, respectively;

reference voltage generating means for generating a reference voltage;

first and second comparator means for comparing the detected voltages of said first and second voltage detector circuits with said reference voltage to decide if they are higher or lower than said reference voltage; and input power shut-off means which is supplied with the decision outputs from said first and second comparator means and, when the decision result from at least one of them differs from the decision result under normal operating conditions, shuts off the supply of said AC power to said primary coil of said transformer.

2. The protection circuit of claim 1, wherein said reference voltage is set at a value lower than the output voltages from said first and second voltage detector circuits under the normal operating conditions of said transformer, and said input power shut-off means shuts off the supply of said AC power to said primary coil of said transformer when at least one of said first and second comparator means decides that said detected voltage is lower than said reference voltage.

3. The protection circuit of claim 2, wherein:

said first and second comparator means comprises first and second comparators having inverting input terminals for said reference voltage and non-inverting input terminals for the detected voltages from said first and second voltage detector circuits, and first and second reverse-current protection diodes having their cathodes connected to the outputs of said first and second comparators, respectively; and said input power shut-off means comprises a light emitting element which is connected to anodes of said first and second reverse-current protection diodes and emits light when at least one of said first and second reverse-current protection diodes is forward-biased, and switching means connected in series between one of said power supply terminals and one end of said primary coil and opens in response to the output light from said light emitting element.

4. The protection circuit of claim 1, wherein said reference voltage is set at a value higher than the output voltages from said first and second voltage detector circuits under the normal operating conditions of said transformer, and said input power shut-off means comprises means for shutting off the supply of said AC power to said primary coil of said transformer when at least one of said first and second comparator means decides that said detected voltage is higher than said reference voltage.

5. The protection circuit of claim 2, further comprising:

second reference voltage generating means for generating a second reference voltage higher than the output voltages from said first and second voltage detector circuits under the normal operating conditions of said transformer; and third and fourth comparator means for comparing the detected voltages of said first and second voltage detector circuits with said second reference voltage to decide if they are higher or lower than said reference voltage; and wherein said input power shut-off means comprises means for shutting off the supply of said AC power to said primary coil of said transformer when at least one of said third and fourth comparator means decides that said detected voltage is lower than said second reference voltage.

6. The protection circuit of claim 5, wherein:

said first and second comparator means comprises first and second comparators having inverting input terminals for said reference voltage and non-inverting input terminals for the detected voltages from said first and second voltage detector circuits, and first and second reverse-current protection diodes having their cathodes connected to the outputs of said first and second comparators, respectively;

said third and fourth comparator means comprises third and fourth comparators having non-inverting input terminals for said second reference voltage and inverting input terminals for the detected voltages from said first and second voltage detector circuits, and third and fourth reverse-current protection diodes having their cathodes connected to the outputs of said third and fourth comparators, respectively; and said input power shut-off means comprises a light emitting element which is connected to anodes of said first, second, third and fourth reverse-current protection diodes and emits light when at least one of said first, second, third and fourth reverse-current protection diodes is forward-biased, and switching means connected in series between one of said power supply terminals and one end of said primary coil and opens in response to the output light from said light emitting element.

7. The protection circuit of claim 6, wherein said first reference voltage is set at a value lower than said second reference voltage.

8. The protection circuit of claim 4, wherein:

said first and second comparator means comprises first and second comparators having non-inverting input terminals for said reference voltage and inverting input terminals for the detected voltages from said first and second voltage detector circuits, and first and second reverse-current protection diodes having their cathodes connected to the outputs of said first and second comparators, respectively; and said input power shut-off means comprises a light emitting element which is connected to anodes of said first and second reverse-current protection diodes and emits light when at least one of said first and second reverse-current protection diodes is forward-biased, and switching means connected in series between one of said power supply terminals and one end of said primary coil and opens in response to the output light from said light emitting element.

9. The protection circuit of claim 3, 8, or 6, wherein said switching means comprises a series connection of a light receiving triac and a relay connected across said power supply terminals, and a switch connected between one of said power supply terminals and one of the terminals of said primary coil and opens in response to the output from said relay.

10. The protection circuit of claim 3, 8, or 6, wherein said switching means comprises a triac connected between one of said power supply terminals and one of the terminals of said primary coil, and a phototriac responsive to light from said light emitting element to open said triac.

11. The protection circuit of any one of claims 1 through 6, wherein: said first and second tertiary coils a redisposed concentrically with said first and second secondary coils inside thereof, respectively, and Said first and second tertiary coils and said first and second secondary coils are respectively separated by sheets of insulating paper having a dielectric strength of several hundred volts, said sheets of insulating paper being wound around said first and second tertiary coils two or more turns.

* * * * *